United States Patent
Bolla (10) Patent No.: US 11,282,072 B2
(45) Date of Patent: Mar. 22, 2022

(54) AUTOMATIC DATA PULL REQUESTS USING A SECURE COMMUNICATION LINK BETWEEN ONLINE RESOURCES

(71) Applicant: PAYPAL, INC., San Jose, CA (US)

(72) Inventor: Raja Ashok Bolla, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 211 days.

(21) Appl. No.: 16/016,322

(22) Filed: Jun. 22, 2018

(65) Prior Publication Data

US 2019/0392428 A1 Dec. 26, 2019

(51) Int. Cl.
- *G06Q 20/36* (2012.01)
- *G06Q 20/14* (2012.01)
- *H04L 29/08* (2006.01)
- *H04L 67/02* (2022.01)

(52) U.S. Cl.
CPC ........... *G06Q 20/363* (2013.01); *G06Q 20/14* (2013.01); *H04L 67/02* (2013.01)

(58) Field of Classification Search
CPC ...... G06Q 20/363; G06Q 20/36; G06Q 20/30; G06Q 20/00; G06Q 20/14; G06Q 20/08; H04L 67/02; H04L 67/00
See application file for complete search history.

(56) References Cited

U.S. PATENT DOCUMENTS

| | | | |
|---|---|---|---|
| 6,373,847 B1 * | 4/2002 | Scoggins | H04L 12/2856 370/401 |
| 2005/0251446 A1 * | 11/2005 | Jiang | G06Q 20/20 705/14.38 |
| 2007/0125840 A1 * | 6/2007 | Law | G06Q 30/04 235/379 |
| 2013/0013499 A1 * | 1/2013 | Kalgi | G06Q 20/3674 705/41 |
| 2013/0208893 A1 * | 8/2013 | Shablygin | H04L 9/3213 380/277 |
| 2013/0346302 A1 * | 12/2013 | Purves | G06Q 20/108 705/40 |
| 2014/0137218 A1 * | 5/2014 | Matson | G06F 21/335 726/6 |
| 2015/0026049 A1 * | 1/2015 | Theurer | G06Q 20/227 705/41 |
| 2016/0063486 A1 * | 3/2016 | Purves | G06Q 20/351 705/35 |
| 2017/0109745 A1 * | 4/2017 | Al-Bedaiwi | H04L 67/42 |
| 2019/0197529 A1 * | 6/2019 | Nelms | G06Q 20/367 |

* cited by examiner

*Primary Examiner* — Namrata Boveja
*Assistant Examiner* — Divesh Patel
(74) *Attorney, Agent, or Firm* — Haynes and Boone, LLP (57) ABSTRACT

There are provided systems and methods for automatic data pull requests using a secure communication link between online resources. An account may be used to electronically process transactions by a user, which may include use of a digital wallet that may store payment instruments used for transaction processing. The user may access an online platform for a service provider that provides a service to the user and bills the user for the service. The online platform may provide transaction processing services for the user's bills. The user may request a secure communication link be established between the service provider's billing platform and the user's digital wallet so that when billing data is available on the billing platform, the data may be pulled by the digital wallet from the platform and loaded to the user's digital wallet for processing.

20 Claims, 6 Drawing Sheets

AUTOMATIC DATA PULL REQUESTS USING A SECURE COMMUNICATION LINK BETWEEN ONLINE RESOURCES

TECHNICAL FIELD

The present application generally relates to automatic cross-platform data retrieval and secure data communications and more specifically to automatically executing data retrieval from an online service provider through a secure link established for the service provider in order to load the data to a single processing platform.

BACKGROUND

Various types of service providers may provide services to users, merchants, other entities, including goods and services for rent, credit cards, utilities, and other types of billable service. These service providers may require payment for these services, which may occur at specific intervals (e.g., monthly) and/or based on use of the service. These service providers may provide online accounts to users for use in processing transactions electronically, which may be used to store information for financial instruments used by the service providers to process the transactions. However, this requires the user to establish multiple different online accounts for transaction processing and remember authentication credentials for each account. Additionally, with the increasing number of security threats to online platforms, the user runs an increased risk of compromising their personal and financial information when it is entered and stored with each service provider's platform.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automatic data pull requests using a secure communication link between online resources. Systems suitable for practicing methods of the present disclosure are also provided.

A transaction processor may provide electronic transaction processing for online transactions where a user may process the transactions through a digital wallet that stores value and/or financial instruments for the user. The digital wallet may be generated after the user establishes an account with an entity associated with the transaction processor, and may allow the user to provide payments to merchants and/or other service providers. Other service providers and/or merchants may also provide goods or services to the user, which may incur a cost owed by the user for receipt of the goods or services. For example, a service provider may generate a bill for the user based on the goods/services, which may be generated at certain time intervals (e.g., monthly) or may be a one-time bill. The service provider may provide an online platform that allows the user to provide a payment for the bill electronically by establishing an account with the service provider and entering data for a payment instrument. In order to provide electronic transaction processing for the bill through the digital wallet, the service provider may further be integrated with the transaction processor.

In this regard, the service provider may provide a link to the transaction processor on the online portal that allows the user to link the service provider's account with the user's digital wallet on the transaction processor's platform. Selection of the link of the service provider's account platform may re-direct the user to the transaction processor's platform (e.g., by navigating the user's device from the service provider's website to the transaction processor's platform). By selecting the link, the user's device may display an application interface for the transaction processor's platform that allows the user to enter authentication credentials for the user's digital wallet account with the transaction processor. The transaction processor may then receive information for the service provider and the user's account with the service provider (e.g., through entry of input by the user and/or using the re-direction navigation process from the service provider). The transaction processor may negotiate encryption keys and/or other security mechanism through a secure communication back channel between the transaction processor and the service provider, and may establish a unique payment flow with the service provider to provide payments for the service provider's bills based on the unique flow. When account data (e.g., a bill) is available with the service provider, the data may be automatically pulled by the transaction processor's platform and loaded to the digital wallet. The user may then view the bill in a digital wallet application interface, and may provide payments to the service provider through the digital wallet interface provided by the transaction processor's platform without accessing the service provider's platform and/or user account. Additionally, when the user finishes using services of the service provider, the unique flow and link to the service provider may be severed by ending the link and removing encryption keys so that the service provider does not receive sensitive financial information for the user.

One or more entities, such as personal users or consumers, groups of users, merchants, businesses, or other commercial or governmental agencies, may wish to process a transaction electronically. For example, a user may wish to purchase an item from an online merchant or otherwise engaging in electronic transactions. In other embodiments, the user may utilize services provided by a service provider and wish to provide payment for a bill for those services. These transactions may correspond to recurring transactions that may cause generation of a bill at certain time intervals (e.g., weekly, monthly, yearly, etc.). Various transaction processors may provide transaction processing services that may allow these two or more entities to engage in electronic transaction processing.

In order to process transactions electronically, the user may be required to establish an account with the transaction provider in order to engage in electronic transaction processing, such as a payment account that includes a digital wallet. The user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide funds to the account and/or an instrument for transaction processing. In order to create an account, the user may be required to select an account name and/or provide authentication credentials, such as a password, personal identification number (PIN), answers to security questions, and/or other authentication information.

The user's account may then be used by the user to perform electronic transaction processing. A computing device may execute a transaction processing application, which may be configured to send and receive payments to another party, such as another user and/or a merchant, or otherwise engage in transaction processing. In various embodiments, a website may provide the transaction processing services, and thus may be accessed by a web browser application. The application (or website) may be associated with a payment provider, such as PayPal® or other online payment provider service, which may provide payments and the other aforementioned transaction processing services on behalf of users, merchants, and other entities. A transaction may therefore be created and processed through an account of a user, for example, by requesting payment for a bill with a service provider.

The user may access an online platform for a merchant or service provider (e.g., in a merchant/service provider application or website) to view a bill for goods or services provided by the entity through one or more interfaces provided by the platform. For example, a graphical user interface of a device used to access the entity's online platform and view the bill available for processing electronically. In various embodiments, the user may be required to setup an account with the entity's online platform for viewing and processing the bill. For example, a credit card company may require a user to generate an account to view the user's transaction history for the credit card and provide a payment for credit extension and use. The bill may be accessed authentication process and an account access portal in a website or a dedicated application of the entity's platform, and the interfaces of the platform may allow a user to interact with the bill and provide a payment. After accessing the account and/or electronic bill on the entity's platform, the platform may include a link in one or more interfaces to allow for establishment of a unique payment flow between the user's digital wallet and the entity for the bill. The entity and the transaction processor providing the digital wallet may previously be integrated so that the entity's platform may automatically provide the link in an interface and allow navigation to the transaction processor and the user's digital wallet. In other embodiments, the user may be required to enter a navigation address, token, or snippet of code to the entity's platform in an interface field (e.g., payment information input field), which may cause the entity's platform to navigate the transaction processor and identify the user's digital wallet for generation of the unique flow.

Once navigated to the transaction processor's digital wallet platform, the user may be required to authenticate their identity/credentials with the transaction processor for the digital wallet account if the user's device is not previously authenticated. The user may enter authentication credentials or other data (e.g., a token for the digital wallet) for the user's digital wallet if required, and the transaction processor's platform may provide one or more digital wallet interfaces for the user's digital wallet. The navigation may be generally to the transaction processor or may navigate the user to a particular process for the transaction processor that is used to add the user's account/electronic bill with the entity to the user's digital wallet. Additionally, navigation to the transaction processor may further cause transmission of electronic bill and/or account data to the transaction processor with the navigation and for the user's digital wallet. Thus, once authenticated, the user's digital wallet may be loaded with account information for the user's account and/or electronic bill with the entity. However, in other embodiments, the user may be required to identify the entity, the entity's online platform address (e.g., website address), and/or the user's account information with the entity in order to have the transaction processor pull the data from the entity and load to the user's digital wallet. For example, the user may be required to enter a routing number, account number, and/or other information for the user's credit card with a credit card provider so that the user's credit card bills may be pulled from the credit card provider's digital platform.

After navigating the user's device to the transaction processor from the entity's online platform and authenticating the user for use of the digital wallet, the user may request that a unique payment flow be established and set-up with the user's digital wallet. The unique payment flow may allow a direct payment from the user's digital wallet to the entity for the bill without exposing the user's payment instruments and/or sensitive data (e.g., personal or financial data) to the entity. In order to setup the unique payment flow, the transaction processor and the entity may negotiate a secure communication channel between their online platforms that may allow for secure data exchange. The secure channel may correspond to a communication link or pathway between the transaction processor's platform and the entity's platform that is encrypted using an encryption protocol, keys, and/or a secret negotiated and exchanged using a secure back channel between the platforms. The secure channel may be specific to the particular unique payment flow, and therefore use encryption keys that are specific to the user's digital wallet and/or the particular payment flow for that entity with the user's digital wallet. Additionally, the transaction processor may generate a virtual account number used to provide payments to the entity for the unique flow. The virtual account number may function like an account number for a payment instrument but may not expose the user's sensitive or confidential data in the user's digital wallet. For example, the virtual account number may link to a virtual account of the transaction processor used to provide payments to the entity, where funds for the virtual account are provided by the user's payment instruments in the digital wallet. After generating the unique payment flow, the user's digital wallet may include an option to view the account/electronic bill data in the user's digital wallet. For example, the user's device may be used to access one or more digital wallet interfaces that may now include an interface option, field, or output data that displays the entity's account/bill data.

The transaction processor for the digital wallet may then load account data for the user's account and/or bill for goods/services with the entity to the user's digital wallet. The account data may correspond to the electronic bill, as well as additional account data, such as a transaction history, purchased goods/services, account information, and/or entity information. In order to provide the account data for the user's account with the entity, the transaction processor may execute one or more data retrieval requests with the entity's online platform to receive, or "pull," the data from the entity's platform. For example, a pull request may be processed by the transaction processor initially for account data after set-up of the unique payment flow. The account data may also be pulled from the entity's platform at certain time intervals (e.g., weekly, monthly, etc.) for a recurring bill, which may be entered by the user and/or determined based on the entity and the user's initial account data. The transaction processor may also query the entity for availability of the data and execute a pull request, or may receive notification from the entity's platform that new account data (e.g., a bill) is available and execute a pull request. The user may also request that the data be retrieved through the digital wallet application interfaces.

The digital wallet may then be used to provide a payment to the entity for the electronic bill through the secure communication link between the user's digital wallet on the transaction processor's platform and the user's account on the entity's platform. The payment may be provided using encrypted communications generated based on the negotiated encryption mechanism. The payment may identify the user's account and/or electronic bill, and may provide a partial or complete payment. The user may set up recurring or automatic payments for the entity using the digital wallet through one or more digital wallet interfaces, or may select a payment amount and issue a one-time payment. When processing the payment, the transaction processor may also utilize the virtual account number to provide the payment to the entity, for example, by providing the virtual account number to the entity with a payment amount to be processed by the entity's platform. This protects the user's digital wallet and sensitive information by not providing such information to the entity. Moreover, the payment is performed through the transaction processor's platform and the digital wallet interfaces. Thus, the user's device does not need to navigate to the entity to perform transaction processing.

If the user discontinuous use of the entity's services, for example, by no longer purchasing or requesting goods or services from the merchant or service provider, the user may request that the transaction processor end the secure communication link and remove the unique payment flow from the user's digital wallet. The transaction processor may delete the unique payment flow from the digital wallet and remove the encryption mechanism used for the secure connection. The transaction processor may purge other data associated with the entity and the user's billing account with the entity so that the transaction processor no longer retains information for the user's billing account for that entity. Thus, the entity and the transaction processor's platforms may no longer be linked through the digital wallet and billing account. The transaction processor may also recycle the virtual account number(s) used to pay for transactions with the entity, which may be used with other unique payment flows as the virtual account number does not identify the user's payment instruments.

In this manner, a transaction processor may utilize digital wallet services to provide a secure connection with an entity's online billing platform. The connection may be secured through back channel negotiation of public/private encryption keys so that the link or connection for data exchange is encrypted. Additionally, use of the digital wallet to provide payments to the entity may provide additional security to the user by preventing proliferation of sensitive data across multiple platforms that may be susceptible to data breach by malicious users. The transaction processor may therefore provide increased online data security and a single convenient platform that provides electronic transaction processing in a faster, more convenient, and more secure manner.

Figure 1:
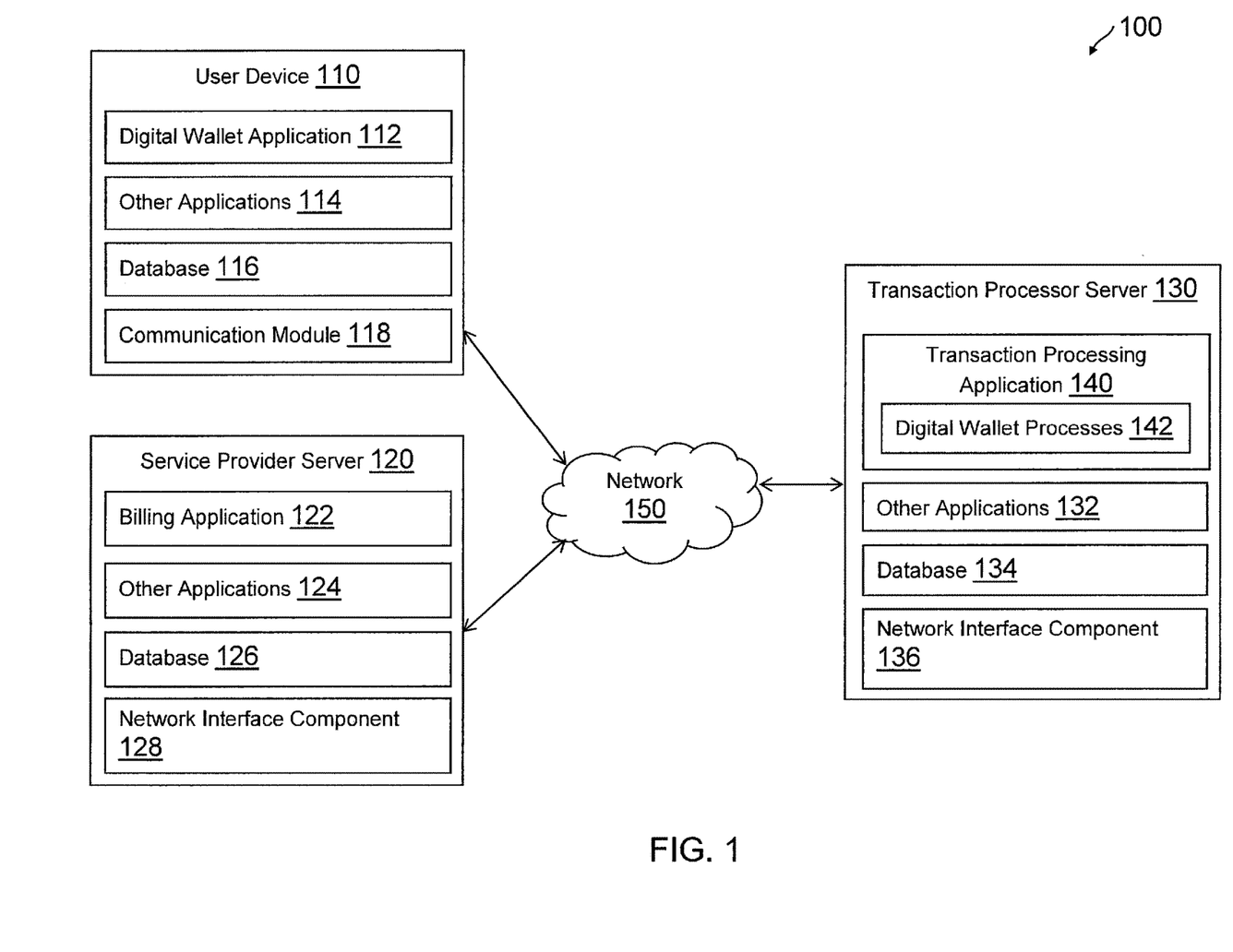
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a service provider server 120, and a transaction processor server 130 in communication over a network 150. User device 110 may be utilized to access the various features available for user device 110, which may include processes and/or applications associated with transaction processing for an electronic bill generated by service provider server 120. User device 110 may also be used to establish and maintain a digital wallet account with transaction processor server 130. In this regard, the user may utilize user device 110 to link the digital wallet to a billing account for the electronic bill with service provider server 120. Transaction processor server 130 may then be used to process a transaction for the electronic bill using the user's digital wallet.

User device 110, service provider server 120, and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with service provider server 120, and/or transaction processor server 130. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. User device 110 may correspond to a device of a consumer or a fraudulent party utilizing an account during electronic transaction processing with a disparate entity, such as the merchant associated with service provider server 120. Although only one communication device is shown, a plurality of communication devices may function similarly.

User device 110 of FIG. 1 contains a digital wallet application 112, other applications 114, a database 116, and a communication module 118. Digital wallet application 112 and other applications 114 may correspond to executable processes, procedures, and/or applications with associated hardware. In other embodiments, user device 110 may include additional or different modules having specialized hardware and/or software as required.

Digital wallet application 112 may correspond to one or more processes to execute software modules and associated devices of user device 110 to process electronic transactions over a network with one or more other services and/or users using a digital wallet for the user associated with user device 110. In this regard, digital wallet application 112 may correspond to specialized hardware and/or software utilized by a user of user device 110 that may be used to access a website or an application interface of transaction processor server 130 that allows user device 110 to establish an account and generate a digital wallet having financial information used to process transactions with service provider server 120 for electronic bills. As discussed herein, digital wallet application 112 may utilize user financial information, such as a credit card, bank account, or other financial account, as a payment instrument when providing payment information for a digital wallet. Additionally, digital wallet application 112 may establish authentication credentials and/or by a data token that allows transaction processing through the digital wallet. Thus, digital wallet application 112 may be utilized to view the results of payment, for example, using transaction histories, dispute resolution processes, and other post-transaction process. In various embodiments, digital wallet application 112 may correspond to a general browser application configured to retrieve, present, and communicate information over the Internet (e.g., utilize resources on the World Wide Web) or a private network. However, in other embodiments, digital wallet application 112 may include a dedicated application of transaction processor server 130 or other entity (e.g., a merchant), which may be configured to assist in processing transactions electronically.

Digital wallet application 112 may utilize one or more user interfaces, such as graphical user interfaces presented using an output display device of user device 110, to enable the user associated with user device 110 to process a transaction with service provider server 120. In certain aspects, digital wallet application 112 and/or one of other applications 114 may access service provider server 120 and view an electronic bill through a billing account used by the user associated with user device 110. During electronic transaction processing, digital wallet application 112 or one of other application 114 may be utilized to select payment instrument(s) for use in providing payment for a purchase transaction, transfer, or other financial process. The user may request that the billing account be linked to the digital wallet generated by digital wallet application 112. After set-up of a unique payment flow for the digital wallet to provide payments for the billing account by transaction processor server 130, digital wallet application 112 may be used to access the digital wallet, view the electronic bill and/or billing account data through the digital wallet, and process payments using the unique flow. Additionally, digital wallet application 112 may be used to end the communication link and delete the unique flow after completion of billing.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include an application used with service provider server 120 to access a billing account with service provider server 120, including a browser application and/or dedicated application associated with service provider server 120. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of user device 110, such as display devices capable of displaying information to users and other output devices, including speakers.

User device 110 may further include database 116 stored in a transitory and/or non-transitory memory of user device 110, which may store various applications and data and be utilized during execution of various modules of user device 110. Database 116 may include, for example, identifiers such as operating system registry entries, cookies associated with digital wallet application 112 and/or other applications 114, identifiers associated with hardware of user device 110, or other appropriate identifiers, such as identifiers used for payment/user/device authentication or identification, which may be communicated as identifying user device 110 to transaction processor server 130. Database 116 may include digital wallet information necessary to access and use a digital wallet, and may further store digital wallet data for use in certain embodiments.

User device 110 includes at least one communication module 118 adapted to communicate with service provider server 120 and/or transaction processor server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Service provider server 120 may be implemented as a computing that may utilize appropriate hardware and software configured for wired and/or wireless communication with user device 110 and/or transaction processor server 130. For example, in one embodiment, service provider server 120 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Service provider server 120 may be used to provide item sales data over a network to user device 110 for the sale of items, for example, through an online merchant marketplace. Thus, in certain embodiments, service provider server 120 may be used to host a website and/or provide website or application data for use in item sales; however, service provider server 120 may also provide item sales through another service provider's platform. In certain embodiments, service provider server 120 may also provide sales through a physical merchant location. Although only one communication device is shown, a plurality of communication devices may function similarly.

Service provider server 120 of FIG. 1 contains a billing application 122, other applications 124, a database 126, and a network interface component 128. Billing application 122 and other applications 124 may correspond to executable processes, procedures, and/or applications with associated hardware. In other embodiments, service provider server 120 may include additional or different modules having specialized hardware and/or software as required.

Billing application 122 may correspond to one or more processes to execute modules and associated specialized hardware of service provider server 120 that provide billing services for purchase of goods and/or services from the service provider or merchant corresponding to service provider server 120. In this regard, billing application 122 may correspond to specialized hardware and/or software of service provider server 120 to provide a convenient interface to permit the service provider to enter, view, and/or edit goods and/or services for use and/or purchase by the user associated with user device 110, which may cause generation of a bill for the services. For example, billing application 122 may be implemented as an application having a user interface enabling a merchant to enter item information and request payment for a transaction on checkout/payment of one or more items/services. In other embodiments, billing application 122 may generate a bill for other services provided by the service provider, such as credit card services, rent, utilities, car loans, house mortgages, student loans, and/or other types of services having one-time or recurring payments that may be processed using a bill. In certain embodiments, billing application 122 may correspond more generally to a web browser configured to view information available over the Internet or access a website corresponding to service provider server 120. Billing application 122 may provide goods and services sales and billing through an online platform. Thus, a user using user device 110 with service provider server 120 may process a transaction using billing application 122.

Once a payment amount is determined for a transaction for items to be purchased by a customer, the merchant may request payment from the customer, for example, through a bill generated for the transaction. The provided transaction information may be made available for access by user device 110. The data may be accessed using a billing account associated with the bill, where billing application 122 may provide an electronic bill on the online platform accessible by user device 110 through the account. The user associated with user device 110 may access the account, and may link the account to a digital wallet through a link provided on the online platform and/or entry of digital wallet data on the online platform. Transaction processor server 130 may process the transaction for the bill using the digital wallet through a unique payment flow and secure communication channel. Billing application 122 may then receive a payment instrument (e.g., a virtual account number) to process the bill and/or funds to pay for the billed amount, and may complete transaction processing for the bill based on the received payment instrument.

In various embodiments, service provider server 120 includes other applications 124 as may be desired in particular embodiments to provide features to service provider server 120. For example, other applications 124 may include security applications for implementing server-side security features, programmatic client applications for interfacing with appropriate application programming interfaces (APIs) over network 150, or other types of applications. Other applications 124 may include server interface applications for an online server platform that output data to one or more devices. For example, other applications 124 may contain software programs, executable by a processor, including a graphical user interface (GUI) configured to provide interface data for display on devices.

Service provider server 120 may further include database 126 stored in a transitory and/or non-transitory memory of service provider server 120, which may store various applications and data and be utilized during execution of various modules of service provider server 120. Database 126 may include, for example, identifiers such as operating system registry entries, cookies associated with billing application 122 and/or other applications 124, identifiers associated with hardware of service provider server 120, or other appropriate identifiers, such as identifiers used for payment/user/device authentication or identification. In various embodiments, database 126 may include billing information for a billing account and electronic bills, as well as data necessary for a unique payment flow for the billing account with a digital wallet provided by transaction processor server 130, such as encryption keys for a secure communication link.

Service provider server 120 includes at least one network interface component 128 adapted to communicate with user device 110 and/or transaction processor server 130 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Transaction processor server 130 may be maintained, for example, by an online service provider, which may provide transaction processing services on behalf of users and/or merchants including generation, use, and/or fraud/risk analysis services for digital gift card processing. In this regard, transaction processor server 130 includes one or more processing applications which may be configured to interact with user device 110, service provider server 120, and/or another device/server to facilitate transaction processing. In one example, transaction processor server 130 may be provided by PAYPAL®, Inc. of San Jose, Calif., USA. However, in other embodiments, transaction processor server 130 may be maintained by or include another type of service provider, which may provide connection services to a plurality of users.

Transaction processor server 130 of FIG. 1 includes a transaction processing application 140, other applications 132, a database 134, and a network interface component 136. Transaction processing application 140 and other applications 132 may correspond to executable processes, procedures, and/or applications with associated hardware. In other embodiments, transaction processor server 130 may include additional or different modules having specialized hardware and/or software as required.

Transaction processing application 140 may correspond to one or more processes to execute software modules and associated specialized hardware of transaction processor server 130 to provide payment and transaction processing services to merchants and users, for example though an account and/or payment instruments of the user in a digital wallet for the account, where the services may further be used to provide digital wallet processes to link the digital wallet to a payment account with service provider server 120 and provide payments for electronic bills. In this regard, transaction processing application 140 may correspond to specialized hardware and/or software to provide transaction processing and payment services through accounts, including digital wallets storing payment instruments. The services may allow for a payment through a payment instrument, including a credit/debit card, banking account, payment account with transaction processor server 130, and/or other funding instrument. The payment may be used to provide a payment for an electronic bill generated for a billing account with service provider server 120. In order to establish an account to send and receive payments, transaction processing application 140 may receive information requesting establishment of the account. The information may include user personal, business, and/or financial information. Additionally the information may include a login, account name, password, PIN, or other account creation information. The entity establishing the account may provide a name, address, social security number, or other personal or business information necessary to establish the account and/or effectuate payments through the account. Transaction processing application 140 may further allow the entity to service and maintain the payment account, for example, by adding and removing funding instruments.

Digital wallet processes 142 of transaction processing application 140 may then be used to provide digital wallet services for the account. Digital wallet processes 142 may receive navigation data for a link from service provider server 120 to transaction processor server 130 by user device 110, and may determine platform data for service provider server 120 used to provide electronic billing services and billing accounts. Digital wallet processes 142 may authenticate user device 110 for use of a digital wallet, and may receive billing account information from the link and/or entry of account information to a digital wallet interface. Digital wallet processes may then receive a request to generate a unique payment flow for the billing account and the digital wallet, and may generate the unique flow or process by negotiating encryption keys specifically for the unique flow with service provider server 120 and determining a virtual account number for use of payments. Digital wallet processes 142 may then associate the unique flow with the digital wallet and store flow data for use. Digital wallet processes 142 may further be used to retrieve account data for the billing account using a pull process or request with service provider server 120.

Transaction processing application 140 may be used to provide a payment for an electronic bill based on pulled billing data for a billing account. Transaction processing application 140 may process the payment to service provider server 120 using a payment instrument and the virtual account number through the secure link for the unique payment flow. The unique payment flow may utilize encrypted data transmissions based on the negotiated encryption keys, and may utilize the virtual account number to protect the financial data in the digital wallet. Transaction processing application 140 may debit an account of the user and provide the payment to an account of the merchant or service provider. The payment may therefore resolve the electronic bill for the billing account. Transaction processing application 140 may also be used to provide transaction histories for processed transactions and bills.

In various embodiments, transaction processor server 130 includes other applications 132 as may be desired in particular embodiments to provide features to transaction processor server 130. For example, other applications 132 may include security applications for implementing server-side security features, programmatic client applications for interfacing with appropriate application programming interfaces (APIs) over network 150, or other types of applications. Other applications 132 may contain software programs, executable by a processor, including a graphical user interface (GUI), configured to provide an interface to the user when accessing transaction processor server 130, where the user or other users may interact with the GUI to more easily view and communicate information. In various embodiments, other applications 132 may include connection and/or communication applications, which may be utilized to communicate information to over network 150.

Additionally, transaction processor server 130 includes database 134. As previously discussed, the user and/or the merchant may establish one or more digital wallets and/or accounts with transaction processor server 130. Digital wallets and/or accounts in database 134 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 130, e.g., from user device 110, one or more digital wallets and/or payment accounts belonging to the users may be found. Database 134 may also digital wallet information and unique payment flows generated for digital wallets, as well as data for the unique payment flows, such as encryption keys and virtual account numbers.

In various embodiments, transaction processor server 130 includes at least one network interface component 136 adapted to communicate with user device 110 and/or service provider server 120 over network 150. In various embodiments, network interface component 136 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
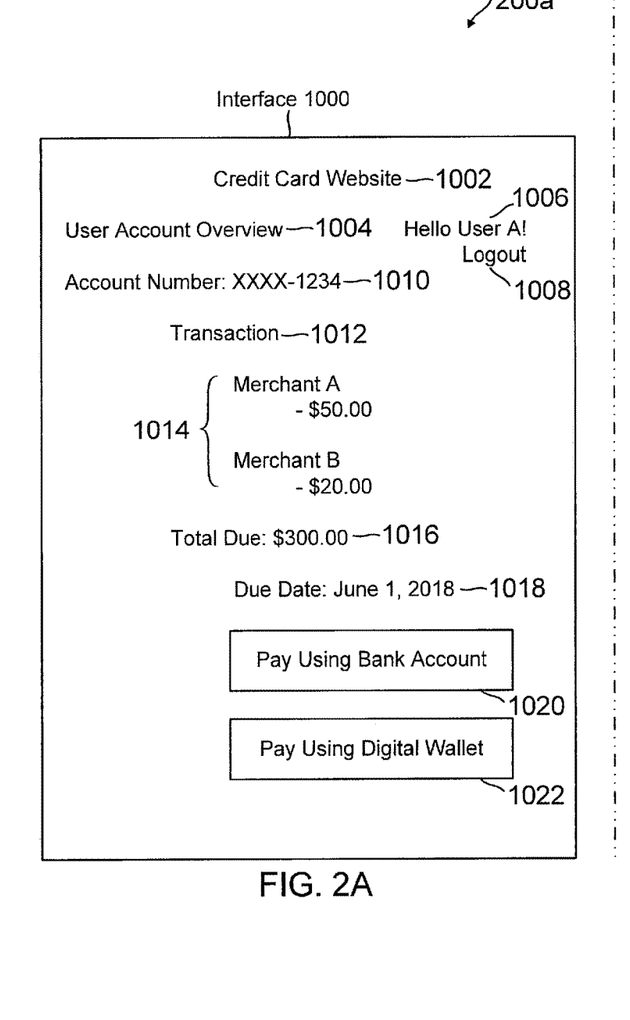
FIG. 2A is an exemplary application interface for a service provider used to establish a secure link to automatically transfer account data to a digital wallet, according to an embodiment.

FIG. 2A is an exemplary application interface for a service provider used to establish a secure link to automatically transfer account data to a digital wallet, according to an embodiment. In environment 200*a* of FIG. 2A, an interface 1000 may be displayed by a user device, such as user device 110 discussed in reference to system 100 of FIG. 1. Interface 1000 may be provided by a device application after accessing a billing account with an online entity for the purpose of providing a payment for an electronic bill. Thus, interface 1000 may be utilized to generate a unique payment flow between the billing account and a digital wallet for providing the payment using the digital wallet.

Interface 1000 includes a credit card website 1002 for a billing service, such as a credit card service that a user A may accrue a bill for using credit services (e.g., for purchases). Credit card website 1002 includes a billing account 1006 for user A, where a user A account overview 1004 may allow the user to perform actions, such as login/logout 1008. Billing account 1006 further includes an account number 1010 for user A that is used to uniquely identify billing account 1006. Additionally, a transaction history 1012 may identify the services, goods, or other items provided to user A for billing account 1006 that may accrue a bill for use/receipt. Transaction history 1012 includes purchases 1014 with a merchant A and a merchant B, and may lead to a bill 1016 due on a due date 1018.

In order to process bill 1016, user A may provide a general payment using bank account payment option 1020. However, bank account payment option 1020 may require that user A enter bank account details and information, thereby opening user A to risk, fraud, and misappropriation of sensitive bank account information by entry to credit card website 1002 (e.g., if credit card website 1002 is compromised). Thus, user A may instead select digital wallet payment option 1022, where digital wallet payment option 1022 includes a navigation link and executable process to navigate user A's device to an interface 1100 in environment 200*b* of FIG. 2B in order to authenticate use of the digital wallet with a transaction processor and generate a unique flow to provide payments for bill 1016 (and future bills) through the digital wallet. This in turn does not require user A to enter sensitive information to credit card website 1002 and allows user A to manage payments through the digital wallet.

Figure 2B:
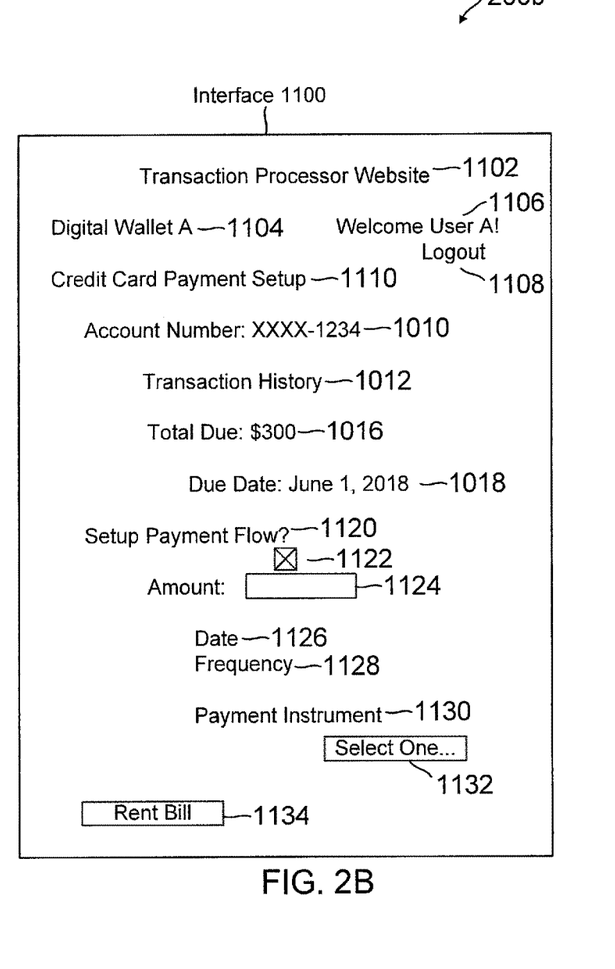
FIG. 2B is an exemplary application interface outputting a digital wallet after pulling data from a service provider for electronic transaction processing, according to an embodiment.

FIG. 2B is an exemplary application interface outputting a digital wallet after pulling data from a service provider for electronic transaction processing, according to an embodiment. In environment 200*b* of FIG. 2B, an interface 1100 may be displayed by a user device, such as user device 110 discussed in reference to system 100 of FIG. 1. Interface 1100 may be provided by a device application after accessing a digital wallet to generate a unique payment flow through a secure communication link/channel and process payments using the digital wallet to credit card website 1002 for bill 1016. Thus, interface 1100 may be utilized to generate the unique payment flow between the billing account and a digital wallet for providing the payment using the digital wallet and process payments.

Interface 1100 displays a transaction processor website 1102 after re-routing and navigation of user A's device to transaction processor website 1102 from credit card website 1002. Transaction processor website 1102 includes a digital wallet A 1104 for an account 1106, where digital wallet A 1104 may allow the user to perform various processes, including authentication through login/logout 1108. After navigation to transaction processor website 1102, a credit card payment setup 1110 may be displayed to generate the unique payment flow for billing account 1006 to pay for bill 1016. Due to the navigation and/or user input, billing account 1006's account number 1010 may be populated to digital wallet A 1104 and displayed within credit card payment setup 1110. Data for billing account 1006 may be retrieved through a pull request that pulls data from credit card website 1002 for billing account 1006. Account number 1010 may be displayed in interface 1100, as well as transaction history 1012, bill 1016, and due date 1018.

After pulling data for billing account 1006, interface 1100 may display a unique payment flow option 1120 that allows user A to opt-in 1122 to generate a unique payment flow through encryption key exchange and generation of a virtual account number. User A may then designate an amount 1124 to provide for bill 1016, as well as a payment date 1126 and a frequency 1128 (e.g., a repeating bill payment, such as monthly payments). User A may also select a payment instrument 1130 for the payment through payment instrument option 1132. Additionally, interface 1100 displays additional unique payment flows for other pre-established payment flows to other service providers using the digital wallet, such as a rent bill payment flow 1134 for rent. This allows the user to manage other digital wallet payments.

Figure 3A:
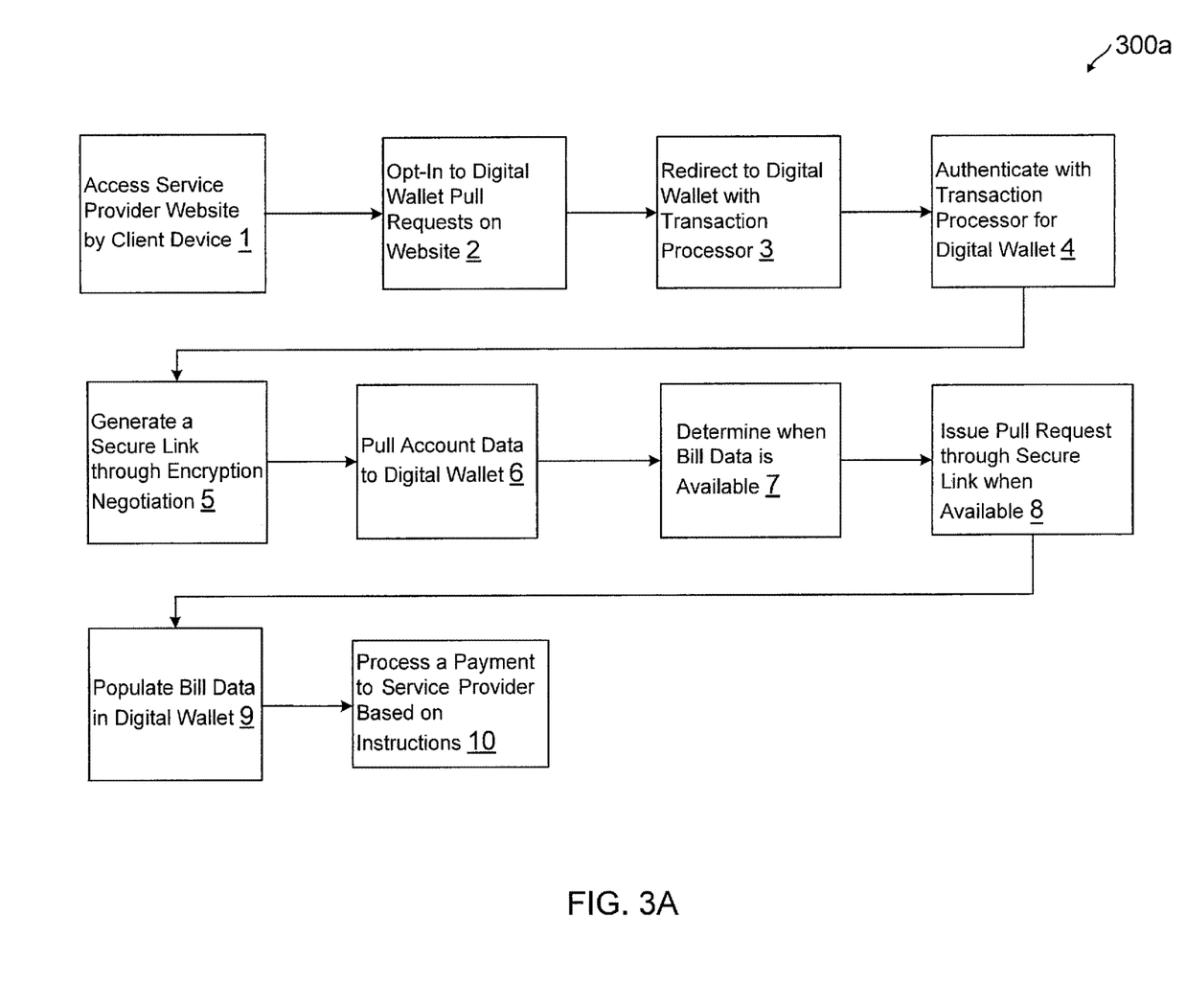
FIG. 3A is a flowchart of a process to setup a secure link between service providers and utilize the link for electronic transaction processing through a digital wallet, according to an embodiment

FIG. 3A is a flowchart 300*a* of a process to setup a secure link between service providers and utilize the link for electronic transaction processing through a digital wallet, according to an embodiment. Flowchart 300*a* corresponds to a process executed by the devices and servers discussed in reference to system 100 of FIG. 1. In this regard, the process of flowchart 300*a* may be utilized to generate a unique payment flow to execute pull requests for account data with a service provider and provide payments without requiring a user's device to access the service provider's online resource.

In flowchart 300*a*, a client device may first access a service provider's website or other online platform at step 1. The website may provide a billing portal and billing account used to process payments for electronic bills generated for a purchase of goods or services by the user, and may be a recurring bill. At step 2, the user utilizes their client device to opt-in to digital wallet pull requests on the website of the service provider, which may be performed through selection of a link or other website interface option. The opt-in option may be automatically populated on the website's billing portal based on an integration between the service provider and a transaction processor for the digital wallet.

At step 3, the client device is redirected from the website of the service provider to the digital wallet with the transaction processor. This may correspond to redirecting a browser application to the transaction processor's website or opening another application on the client device for the transaction processor. Once redirected, the user may be required to authenticate the client device for use of the digital wallet at step 4, which may require entry of authentication credentials, use of a cookie or token, or other authentication process.

The transaction processor may then utilize the digital wallet and a secure back channel for establishment of a secure link between the user's digital wallet and the billing account with the service provider through negotiation of encryption mechanisms/keys at step 5. The secure link may correspond to a communication channel that allows secure exchange of data from the transaction processor to the service provider and is particular to the user's digital wallet and/or particular payment flow for the billing account with the service provider. Using the secure link established for the billing account, the transaction processor may pull account data to the user's digital wallet at step 6. A pull request may be utilized to retrieve data for the user's billing account on the service provider's platform and automatically load the data to the user's digital wallet so that the user may view and interact with the billing account's data on the transaction processor's digital wallet platform. This may include an account number, transaction history, billing account details, or other account information.

At step 7, the transaction processor may then determine when bill data is available with the service provider, which may be done based on expiration of a time period, user request, and/or notification of available account data. The transaction processor may then issue a pull request to the secure link when the bill data is available to retrieve the bill data at step 8. This may include loading an amount for a bill and transaction history for the bill to the user's digital wallet for viewing. The user may view the bill data after it is populated to the digital wallet through one or more digital wallet interfaces accessible through the transaction processor's platform at step 9. Further, the user may then provide instructions to the transaction processor that requests the transaction processor provide a payment to the service provider for the bill data using the digital wallet. At step 10, the transaction processor may then provide the payment based on the instructions.

Figure 3B:
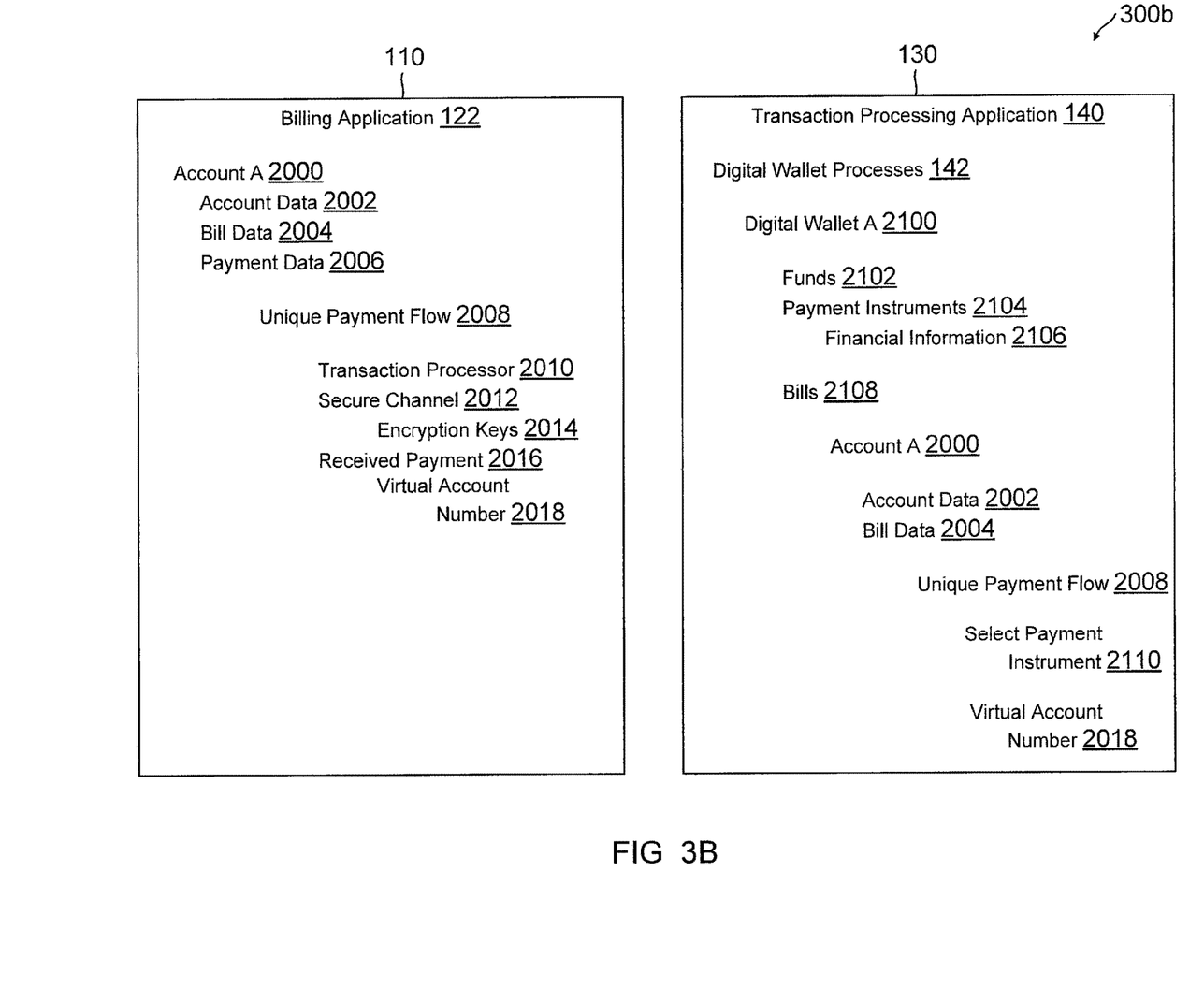
FIG. 3B is an exemplary system environment where a communication device and a merchant device may interact during link selection for redemption of a gift card and a service provider may determine a fraud assessment of the communication device when redeeming the gift card, according to an embodiment.

FIG. 3B is an exemplary system environment where a communication device and a merchant device may interact during link selection for redemption of a gift card and a service provider may determine a fraud assessment of the communication device when redeeming the gift card, according to an embodiment. FIG. 3 includes service provider server 120 and transaction processor server 130 discussed in reference to system 100 of FIG. 1.

In environment 300, service provider server 120 executes billing application 122 corresponding generally to the processes and features discussed in reference to system 100 of FIG. 1. In this regard, service provider server 120 may utilize billing application 122 to generate an electronic bill for goods or services provided to a user associated with a user device, such as user device 110 discussed in reference to system 100 of FIG. 1 and used to access service provider server 120 and/or transaction processor server 130 to pay the bill. An account A 2000 may correspond to the user's billing account, and may include account data 2002, such as an account number, user information, and/or account transaction histories. Account A 2000 may further be associated with bill data 2004 for the electronic bill, where bill data 2004 may be processed using payment data 2006.

In contrast to traditional payment information, such as a credit card or bank account, payment data 2006 includes a unique payment flow set up with transaction processor server 130. Unique payment flow 2008 may have data stored with service provider server 120 for use in processing a payment, such as including identification of transaction processor 2010 (e.g., an identifier for transaction processor server 130). Unique payment flow 2008 further includes a secure channel 2012 that is secured using encryption keys 2014. Payment data 2006 for service provider server 120 may further included a received payment 2016 through a virtual account number 2018.

In environment 300, transaction processor server 130 executes transaction processing application 140 corresponding generally to the processes and features discussed in reference to system 100 of FIG. 1, such as digital wallet processes 142. In this regard, transaction processor server 130 may use transaction processing application 140 to execute digital wallet processes 142 to provide digital wallet payments for bill data 2004 through a digital wallet A 2100. Digital wallet A 2100 includes funds 2102 and payment instruments 2104 having financial information 2106. Additionally, after establishment of unique payment flows, such as unique payment flow 2008, bills 2108 may be loaded to digital wallet A 2100. For example, account A 2000 with service provider server 120 may be populated to digital wallet A 2100, and account data 2002 and bill data 2004 may be stored with digital wallet A 2100 for processing. Unique payment flow 2008 may then be used to process a selected payment instrument 2110 for bill data 2004, and virtual account number 2018 may be used to provide a payment from selected payment instrument 2110.

Figure 4:
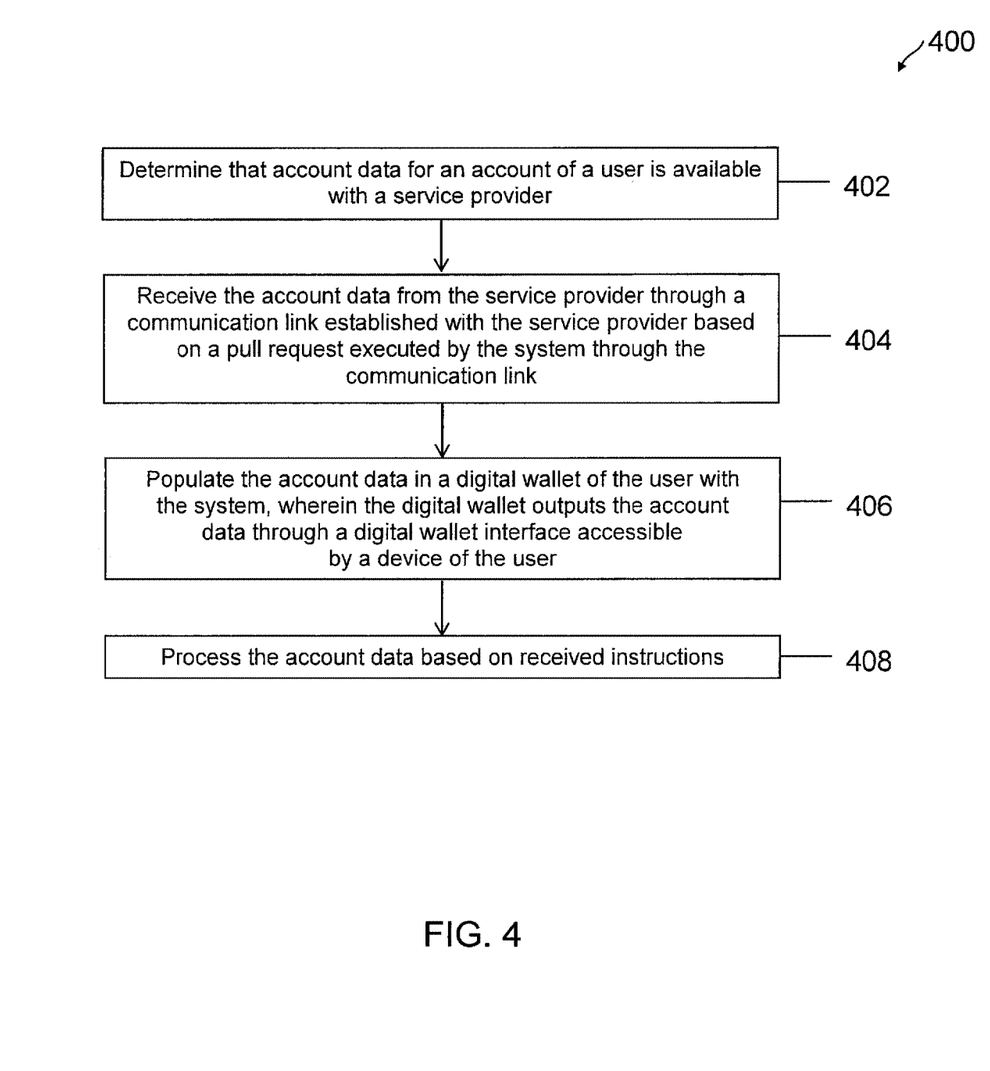
FIG. 4 is a flowchart of an exemplary process for automatic data pull requests using a secure communication link between online resources, according to an embodiment.

FIG. 4 is a flowchart 400 of an exemplary process for automatic data pull requests using a secure communication link between online resources, according to an embodiment. Note that one or more steps, processes, and methods described herein may be omitted, performed in a different sequence, or combined as desired or appropriate.

At step 402 of flowchart 400, it is determined that account data for an account of a user is available with a service provider. Prior to this, a navigation event to a system providing a digital wallet may be received from a website of the service provider, and the user may authenticate use of the digital wallet. In response to this, a communication link and pull request with the service provider may be generated. The communication link may be generated by negotiating a shared secret between the system and the service provider, generating a unique payment flow between the system and the service provider, and storing the shared secret for the account through the unique payment flow. The shared secret may be negotiated through a secure backend key exchange between the system and the service provider, wherein the secure backend key exchange is previously established by the system with the service provider. The service provider may send a communication that the account data is available, or the system may utilize a time cycle to determine the account data is available.

The account data is received from the service provider through a communication link established with the service provider based on a pull request executed by the system through the communication link, at step 404 of flowchart 400. The account data may be received through a payment flow that is encrypted and may comprise an account number and routing number for the account. The pull request may pull the account data from the website using at least an account number for the account provided by the service provider to the system. At step 406 of flowchart 400, the account data is populated in a digital wallet of the user with the system, wherein the digital wallet outputs the account data through a digital wallet interface accessible by a device of the user.

At step 408 of flowchart 400, the account data is processed based on received instructions. The account data may correspond to an electronic bill having bill data that may be processed using a virtual account with the digital wallet of the user. For example, the bill data may be for a bill owed by the user to the service provider, wherein the instructions comprise payment instructions for the bill using the digital wallet, and wherein the instructions may be preset or may be received from user input. Processing the account data may comprise providing a payment for a bill associated with the account using a virtual account number generated by the system for the account, wherein the virtual account number prevents transmission of financial account information for the user stored with the digital wallet. This may correspond to recurring bills and payments, which may be for housing rental, vehicle payment, or credit card use. This virtual account number may also be stored and reused for those recurring payments. In various embodiments, a request to sever the communication link and prevent transaction processing with the service provider for the account may be received, and the communication link may be ended (e.g., by purging information for the link). The option to process the account data with the digital wallet may then be removed from the digital wallet.

Figure 5:
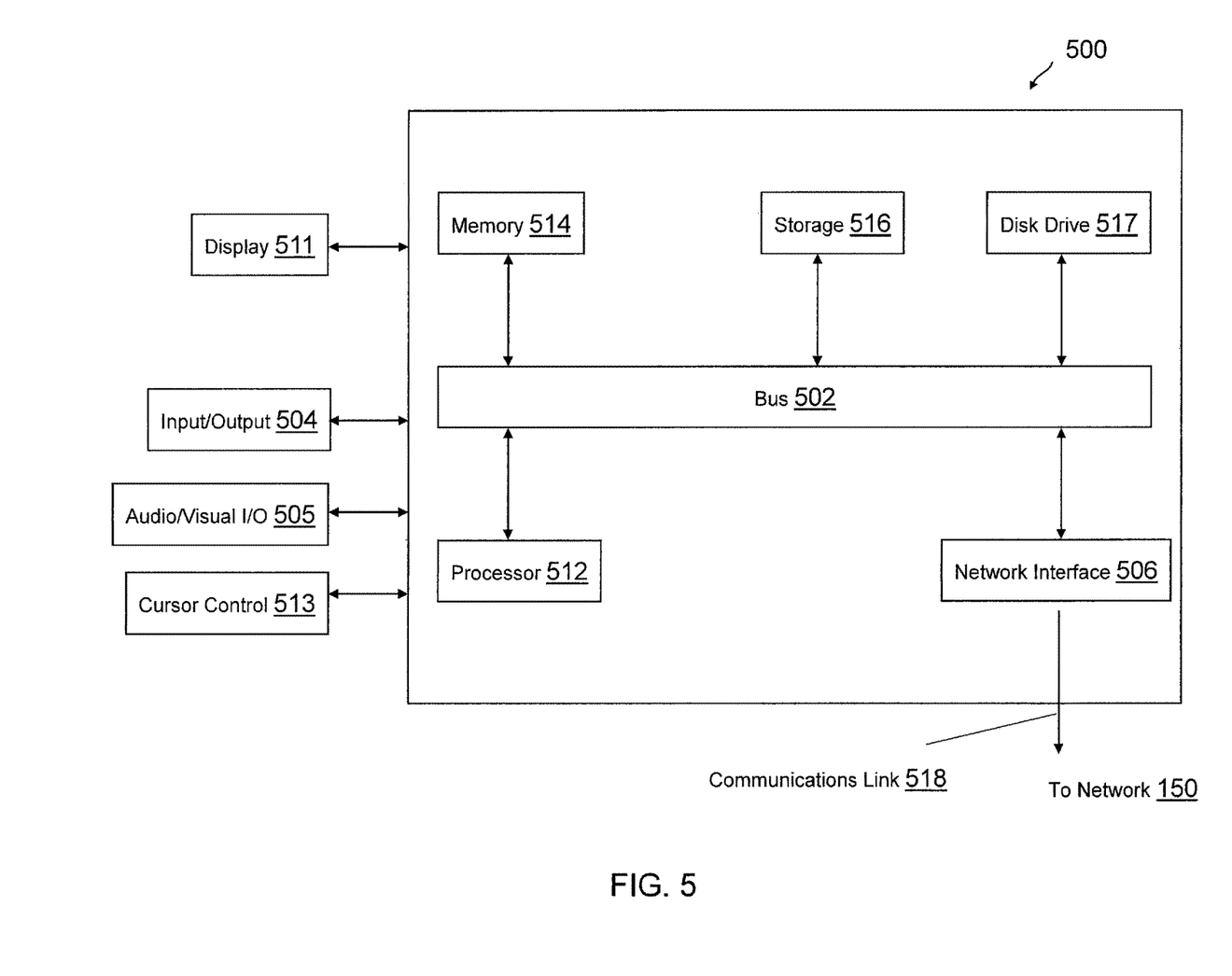
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and one or more hardware processors coupled to the non-transitory memory and configured to read instructions from the non-transitory memory to cause the system to perform operations comprising:
- determining, from an external website provided by a first service provider different from a second service provider associated with the system, that account data for an account of a user is available with the first service provider;
- determining a payment flow for the account to process payments between an internal website provided by the second service provider associated with the system and the external website provided by the first service provider on behalf of the user, wherein the payment flow is unique to the external website and the account and comprises an encryption key uniquely assigned to the first service provider to process the payments via a secure communication link from a plurality of encryption keys for the user each uniquely assigned to a plurality of service providers for securing electronic communications from the internal website;
- encrypting the secure communication link with the external website of the first service provider using the encryption key for the payment flow;
- rerouting a user interface of a device of the user from the external website to the internal website based on the payment flow;
- requesting the account data from the first service provider via the secure communication link used during the payment flow;
- receiving, by the system, the account data from the first service provider through the secure communication link established with the first service provider based on a pull request executed by the system through the secure communication link;
- populating the account data in the user interface for a digital wallet of the user with the system, wherein the user interface outputs the account data through a digital wallet interface accessible by a device of the user;
- determining processing instructions associated with the account data;
- processing the account data with the first service provider based on the instructions associated with the account data thereby completing an instance of the payment flow; and
- maintaining the secure communication link for the payment flow such that a subsequent instance of the payment flow is completed via the internal website without the user interface of the device of the user accessing the external website to complete the subsequent instance of the payment flow.

2. The system of claim 1, wherein the account data comprises bill data for a bill owed by the user to the first service provider, wherein the instructions associated with the account data comprise payment instructions for the bill using the digital wallet, and wherein the instructions associated with the account data are set with the system prior to the receiving the account data or received from user input after display of the bill data with the digital wallet.

3. The system of claim 1, wherein prior to determining that the account data is available, the operations further comprise:
- receiving a navigation event to the system from the external website of the first service provider;
- authenticating the user for a use of the digital wallet based on received authentication credentials during the navigation event; and
- generating the secure communication link and the pull request based on an approval by the user to load the account data to the digital wallet.

4. The system of claim 3, wherein the operations further comprise negotiating the encryption key between the system and the first service provider, generating the payment flow between the system and the first service provider, and storing the encryption key for the account through the payment flow.

5. The system of claim 4, wherein the encryption key is negotiated through a secure backend key exchange between the system and the first service provider, and wherein the secure backend key exchange is previously established by the system with the first service provider.

6. The system of claim 1, wherein determining that the account data is available is based on a time cycle for the account data or a communication by the system with the first service provider, and wherein prior to receiving the account data, the operations further comprise:
- executing the pull request through the secure communication link based on the one of the time cycle or the communication.

7. The system of claim 1, wherein the account data is available on the external website of the first service provider, and wherein the pull request pulls the account data from the external website using at least an account number for the account provided by the first service provider to the system.

8. The system of claim 1, wherein the operations further comprise:
- receiving a request to sever the secure communication link with the first service provider for the account;
- ending the secure communication link with the first service provider; and
- removing an option to process transactions for the account from the digital wallet.

9. The system of claim 8, wherein ending the secure communication link removes the payment flow between the system and the first service provider for the account and purges the encryption key from the system for the secure communication link.

10. The system of claim 1, wherein processing the account data comprises providing a payment for a bill associated with the account using a virtual account number generated by the system for the account, and wherein the virtual account number prevents transmission of financial account information for the user stored with the digital wallet.

11. The system of claim 1, wherein the account comprises at least one of a housing rental account, a vehicle payment account, or a credit card account, and wherein processing the account data comprises providing a payment for a recurring bill for the account.

12. A method comprising:
- receiving, by a transaction processor, a navigation redirection from an external website associated with a billing account for a user to a digital wallet interface for a digital wallet with the transaction processor for an internal website of the transaction processor;
- receiving authentication credentials for the digital wallet through the digital wallet interface;
- authenticating the user for use of the digital wallet based on the authentication credentials;
- generating an executable billing flow for the digital wallet with the billing account, wherein the executable billing flow comprises a secure communication channel between the transaction processor and the external website, and wherein the executable billing flow is unique to the external website in the billing account and comprises an encryption key uniquely assigned to the external website to process payments for the billing account via the secure communication channel from a plurality of encryption keys for the user each uniquely assigned to a plurality of service providers for securing electronic communications from the internal website;

encrypting the secure communication channel with the external website using the encryption key for the executable billing flow;

determining, from the external website of a service provider different from the transaction processor, that billing data associated with the billing account is available for the external website;

generating a pull request for the billing data associated with the billing account;

processing the pull request using the executable billing flow through the secure communication channel;

rerouting a user interface of a device of the user from the external website to the digital wallet interface for the internal website based on the executable billing flow; and maintaining the secure communication channel for the executable billing flow such that a subsequent instance of the executable billing flow is completed via the digital wallet interface without the user interface of the device of the user accessing the external website to complete the subsequent instance of the executable billing flow.

13. The method of claim 12, wherein generating the executable billing flow comprises exchanging, by the transaction processor, the encryption key for the secure communication channel with the external website through a secure key exchange.

14. The method of claim 12, wherein the pull request is generated based on a billing cycle timeline for the billing account.

15. The method of claim 12, further comprising:
generating a virtual account number for a payment for the billing data, wherein the virtual account number hides financial data for the digital wallet from the external website; and
processing the payment using the virtual account number.

16. The method of claim 15, wherein the virtual account number is stored with the billing account, and wherein the virtual account number is reused for a subsequent payment for the billing account.

17. The method of claim 12, wherein processing the pull request comprises requesting the billing data through the secure communication channel and receiving the billing data from the external website of the service provider through the secure communication channel.

18. A non-transitory machine-readable medium having stored thereon machine-readable instructions executable to cause a machine to perform operations comprising:
determining an encrypted payment flow for an account to process payments between the machine and a service provider on behalf of a user associated with the account, wherein the encrypted payment flow is unique to the service provider in the account and comprises an encryption key uniquely assigned to the service provider to process the payments via a secure communication channel from a plurality of encryption keys for the account each uniquely assigned to a plurality of service providers for securing electronic communications from an internal website associated with the machine;
encrypting the secure communication channel with an external website of the service provider using the encryption key for the encrypted payment flow;
determining, from the external website of the service provider different from the machine, that bill data associated with a service provider account with the service provider is available for the external website;
requesting, by the machine associated with a transaction provider, the bill data for the service provider account with the service provider through the encrypted payment flow between the machine and the external website;
receiving the bill data through the encrypted payment flow;
loading the bill data to a digital wallet platform provided by the machine;
rerouting a user interface of a device of the user from the external website to the internal website based on the encrypted payment flow, wherein the internal website provides the digital wallet platform;
processing the bill data with the service provider based on a processing request received by the machine; and
maintaining the secure communication channel for the encrypted payment flow such that a subsequent instance of the encrypted payment flow is completed via the internal website without the user interface of the device of the user accessing the external website to complete the subsequent instance of the encrypted payment flow.

19. The non-transitory machine-readable medium of claim 18, wherein the encrypted payment flow comprises an account number and a routing number for the account.

20. The non-transitory machine-readable medium of claim 19, wherein the bill data is processed after receiving selection of an interface link by a device that is output with digital wallet data for the digital wallet platform and receiving the processing request to process the bill data using a virtual account through the interface link.

* * * * *